United States Patent
Park et al.

(10) Patent No.: US 10,953,870 B2
(45) Date of Patent: Mar. 23, 2021

(54) APPARATUS FOR CONTROLLING PARKING OF VEHICLE, SYSTEM HAVING THE SAME, AND METHOD THEREOF

(71) Applicants: HYUNDAI MOTOR COMPANY, Seoul (KR); KIA MOTORS CORPORATION, Seoul (KR)

(72) Inventors: Jong Ho Park, Incheon (KR); Dong Hae Kim, Jeonju-si (KR); Gil Won Seo, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 206 days.

(21) Appl. No.: 16/189,024

(22) Filed: Nov. 13, 2018

(65) Prior Publication Data
US 2020/0070814 A1 Mar. 5, 2020

(30) Foreign Application Priority Data
Aug. 28, 2018 (KR) .......................... 10-2018-0101226

(51) Int. Cl.
*B60W 30/06* (2006.01)
*G05D 1/00* (2006.01)
*B60W 40/105* (2012.01)
*B62D 15/02* (2006.01)

(52) U.S. Cl.
CPC .......... *B60W 30/06* (2013.01); *B60W 40/105* (2013.01); *B62D 15/0285* (2013.01); *G05D 1/0055* (2013.01); *G05D 2201/0213* (2013.01)

(58) Field of Classification Search
CPC ... B60W 30/06; B60W 40/00; B62D 15/0285; B62D 15/027; B62D 15/029; B60R 2300/806; B66B 2201/242; B60Y 2300/06; B60T 2201/10; G01S 2015/932; G06K 9/00812; G08G 1/168; G05D 1/0055

See application file for complete search history.

(56) References Cited

U.S. PATENT DOCUMENTS

| | | | |
|---|---|---|---|
| 9,031,731 B2 * | 5/2015 | Choi ................... | B62D 15/0285 |
| | | | 701/23 |
| 9,113,049 B2 * | 8/2015 | Yoon ...................... | H04N 7/183 |
| 9,371,091 B2 * | 6/2016 | Moon ................. | B62D 15/0285 |
| 9,731,765 B2 * | 8/2017 | Yang .................... | B62D 15/021 |

(Continued)

FOREIGN PATENT DOCUMENTS

JP 2009248765 A * 10/2009 ............. B60R 21/00

*Primary Examiner* — Ig T An
(74) *Attorney, Agent, or Firm* — Morgan, Lewis & Bockius LLP

(57) ABSTRACT

The present disclosure relates to an apparatus for controlling the parking of a vehicle, a system having the same, and a method thereof. the apparatus for controlling parking of a vehicle includes a processor determining whether to generate a virtual object, depending on a length of a parking space and a current location of a vehicle, determining a parking target space in the parking space based on the virtual object upon generating the virtual object, generating a parking trajectory such that the vehicle is parked to the parking target space, to perform parking control based on the parking trajectory, when the parking space between a first object and a second object is scanned, and storage storing information generated by the processor.

17 Claims, 12 Drawing Sheets

(56) References Cited

U.S. PATENT DOCUMENTS

| | | | |
|---|---|---|---|
| 2009/0121899 A1* | 5/2009 | Kakinami | G06K 9/00805 340/932.2 |
| 2009/0167564 A1* | 7/2009 | Long-Tai | B62D 15/0285 340/932.2 |
| 2010/0019935 A1* | 1/2010 | Kawabata | B62D 15/028 340/932.2 |
| 2010/0259420 A1* | 10/2010 | Von Reyher | B62D 15/028 340/932.2 |
| 2012/0062394 A1* | 3/2012 | Pampus | G08G 1/14 340/932.2 |
| 2016/0207526 A1* | 7/2016 | Franz | B62D 15/028 |
| 2017/0028914 A1* | 2/2017 | Kiyokawa | B62D 15/0285 |
| 2017/0043808 A1* | 2/2017 | Yang | G08G 1/143 |
| 2017/0129486 A1* | 5/2017 | Nakada | B60W 10/20 |
| 2017/0139415 A1* | 5/2017 | Stefan | G05D 1/0088 |

* cited by examiner

Ｕ Ｓ １０，９５３，８７０ Ｂ２

APPARATUS FOR CONTROLLING PARKING OF VEHICLE, SYSTEM HAVING THE SAME, AND METHOD THEREOF

CROSS-REFERENCE TO RELATED APPLICATION

This application is based on and claims the benefit of priority to Korean Patent Application No. 10-2018-0101226, filed on Aug. 28, 2018 with the Korean Intellectual Property Office, the entire contents of which are incorporated herein by reference.

TECHNICAL FIELD

The present disclosure relates to an apparatus for controlling the parking of a vehicle, a system having the same, and a method thereof, and more particularly to a technology capable of supporting parking assistance for the next parking space of a vehicle parked in a parking lot.

BACKGROUND

With the development of automobile technology, since a system that assists the parking of a vehicle has been developed, the system solves the difficulty of parking due to the narrow parking space or the inexperienced driving of a driver.

Such the parking assist system recognizes a parking space based on information about the distance from the surrounding object by using an ultrasonic sensors, a radar, and a LiDAR and automatically controls the steering, vehicle speed, and shift without the driver's steering wheel manipulation such that the vehicle is securely parked in a recognized parking space.

On the other hand, a conventional parking assist system supports parking in a space before an object with respect to the object (the parked vehicle); even though the next parking spaces of the parked vehicle are empty, the conventional parking assist system may fail to perform the parking assistance in the next parking space of the parked vehicle being empty, but may perform the parking assistance in the previous parking space of the parked vehicle. Therefore, the spatial efficiency of parking assistance is low.

SUMMARY

The present disclosure has been made to solve the above-mentioned problems occurring in the prior art while advantages achieved by the prior art are maintained intact.

An aspect of the present disclosure provides an apparatus for controlling the parking of a vehicle, a system having the same, and a method thereof that are capable of performing parking control on the next parking space of an object (the parked vehicle) in a parking control mode.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling parking of a vehicle includes a processor determining whether to generate a virtual object, depending on a length of a parking space and a current location of a vehicle, determining a parking target space in the parking space based on the virtual object upon generating the virtual object, generating a parking trajectory such that the vehicle is parked to the parking target space, to perform parking control based on the parking trajectory, when the parking space between a first object and a second object is scanned, and a storage storing information generated by the processor.

According to an embodiment, the processor is configured to determine that the entire scanned parking space is the parking target space, when a length of the parking space between the first object and the second object is less than a predetermined reference value.

According to an embodiment, the processor is configured to determine the parking target space in the parking space such that the vehicle is parked within a specific distance from an object with the least number of parking steps during the parking control at the current location of the vehicle, when a length of the parking space between the first object and the second object is greater than a predetermined reference value.

According to an embodiment, the processor is configured to determine that the parking space includes a first parking space adjacent to the first object and a second parking space located between the first parking space and the second object, when the length of the parking space between the first object and the second object is greater than the predetermined reference value.

According to an embodiment, when the current location of the vehicle is located before the second object, the processor is configured to generate the virtual object in the second parking space, and to determine that the first parking space is the parking target space.

According to an embodiment, the processor is configured to determine that the second parking space is the parking target space, when the current location of the vehicle is located next to or after the second object.

According to an embodiment, the processor is configured to determine a location of the virtual object depending on whether a curb or a wall is present and a slope direction of the first object.

According to an embodiment, when the curb or the wall is present, the processor is configured to determine a location, which moves from the first object in a direction of the curb or the wall by an overall length or an overall width of the vehicle, to be an X-coordinate of the virtual object, to determine a location, which moves from the curb in a direction perpendicular to the curb or the wall by the overall width or the overall length of the vehicle, to be a Y-coordinate of the virtual object, and to determine an angle of the virtual object by using the direction of the curb or the wall.

According to an embodiment, when the curb or the wall is not present, the processor is configured to extract a slope of the first object to determine a location, which moves in a slope direction of the first object at each corner point of the first object by an overall length or an overall width of the vehicle, to be an X-coordinate of the virtual object, to determine a location identical to each corner point of the first object in the slope direction of the first object, to be a Y-coordinate of the virtual object, and to determine an angle of the virtual object by using the slope of the first object.

According to an embodiment, when the curb or the wall is not present and it is impossible to extract a slope of the first object, the processor is configured to determine a location, which moves in a space scan direction of the vehicle from each corner point of the first object by an overall length or an overall width of the vehicle, as an X-coordinate of the virtual object, to determine a location identical to each corner point of the first object in the space scan direction of the vehicle, as a Y-coordinate of the virtual object, and to determine an angle of the virtual object by using the space scan direction of the vehicle.

According to an embodiment, the processor is configured to generate the parking trajectory based on the first object and the virtual object.

According to an embodiment, the processor is configured to generate a plurality of parking trajectories by using at least one or more of a steering ratio of a vehicle, a current location of the vehicle, and a parking target space, to extract trajectories, in each of which the first object and the second object do not collide with the vehicle, from among the plurality of parking trajectories, and to select a trajectory with a shortest route among the extracted trajectories.

According to an aspect of the present disclosure, a vehicle system includes a sensor scanning an object and a parking space and a vehicle parking controlling apparatus configured to determine whether to generate a virtual object, depending on a length of the parking space and a current location of a vehicle, to determine a parking target space in the parking space based on the virtual object upon generating the virtual object, and to generate a parking trajectory such that the vehicle is parked to the parking target space, to perform parking control based on the parking trajectory, when the parking space between a first object and a second object is scanned.

According to an embodiment, the vehicle system further includes a display device displaying the scanned object, the scanned parking space, and the parking trajectory.

According to an aspect of the present disclosure, a method of controlling parking of a vehicle includes determining whether to generate a virtual object, depending on a length of a parking space and a current location of a vehicle to generate the virtual object, when the parking space between a first object and a second object is scanned, determining a parking target space in the parking space based on the virtual object, generating a parking trajectory such that the vehicle is parked to the parking target space, and performing parking control based on the parking trajectory.

According to an embodiment, the determining of the parking target space includes determining that the entire scanned parking space is the parking target space, when a length of the parking space between the first object and the second object is less than a predetermined reference value.

According to an embodiment, the determining of the parking target space includes determining the parking target space in the parking space such that the vehicle is parked within a specific distance from an object with the least number of parking steps during the parking control at the current location of the vehicle, when a length of the parking space between the first object and the second object is greater than a predetermined reference value.

According to an embodiment, the determining of the parking target space includes determining that the parking space includes a first parking space adjacent to the first object and a second parking space located between the first parking space and the second object, when the length of the parking space between the first object and the second object is greater than the predetermined reference value, generating the virtual object in the second parking space and determining that the first parking space is the parking target space, when the current location of the vehicle is located before the second object, and determining that the second parking space is the parking target space, when the current location of the vehicle is located next to or after the second object.

According to an embodiment, the generating of the virtual object includes determining a location of the virtual object depending on whether a curb or a wall is present and a slope direction of the first object.

According to an embodiment, the generating of the parking trajectory includes generating the parking trajectory based on the first object and the virtual object or generating a plurality of parking trajectories by using at least one or more of a steering ratio of a vehicle, the current location of the vehicle, and the parking target space, extracting trajectories, in each of which the first object and the second object do not collide with the vehicle, from among the plurality of parking trajectories, and selecting a trajectory with the shortest route among the extracted trajectories.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
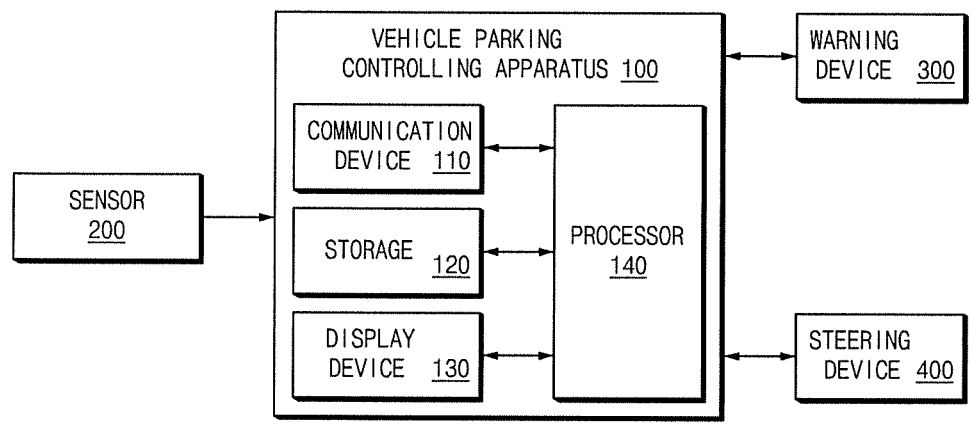
FIG. 1 is a block diagram illustrating a configuration of a vehicle system including a vehicle parking controlling apparatus, according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Below, various embodiments of the present disclosure will be described in detail with reference to FIGS. 1 to 10.

Figure 2:
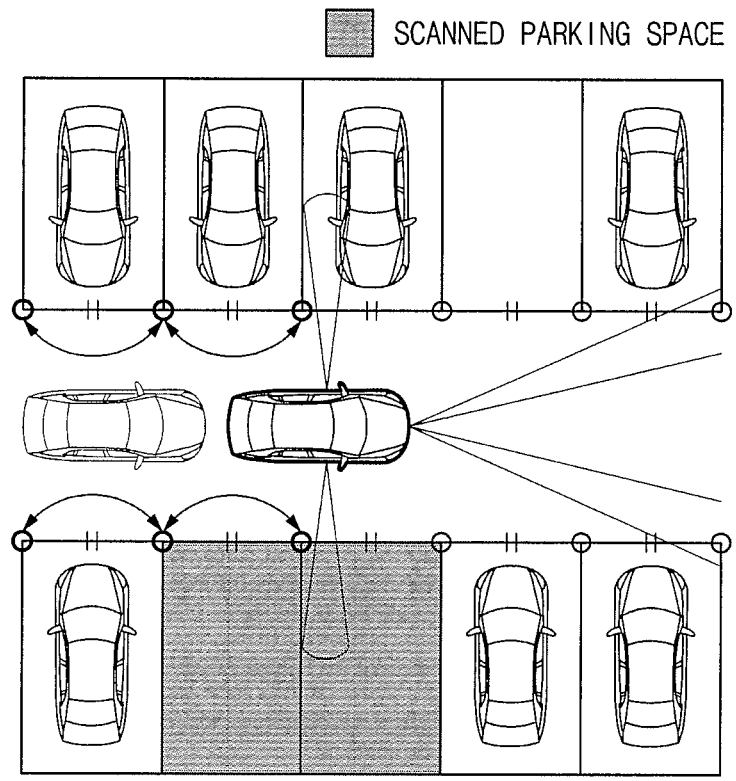
FIG. 2 is a schematic diagram illustrating an operation of a sensor of a vehicle, according to an embodiment of the present disclosure.

FIG. 1 is a block diagram illustrating a configuration of a vehicle system including a vehicle parking controlling apparatus, according to an embodiment of the present disclosure. FIG. 2 is a schematic diagram illustrating an operation of a sensor of a vehicle, according to an embodiment of the present disclosure.

Referring to FIG. 1, a vehicle parking controlling apparatus 100 according to an embodiment of the present disclosure may include a sensor 200, a warning device 300, and a steering device 400.

The vehicle parking controlling apparatus 100 determines whether to generate a virtual object, depending on the length of a parking space and the current location of a vehicle, determines a parking target space in the parking space based on the virtual object when generating the virtual object, and generates a parking trajectory such that the vehicle is parked to the parking target space, to perform parking control based on the parking trajectory, when a parking space between a first object and a second object is found by the sensor module 200 after entering a parking lot.

The vehicle parking controlling apparatus 100 may include a communication device 110, storage 120, a display device 130, and a processor 140.

The communication device 110 may be a hardware device implemented with various electronic circuits for transmitting and receiving signals via a wireless or wired connection; in the present disclosure, the communication device 110 may perform communication in a vehicle over CAN communication, LIN communication, or the like and may communicate with the sensor 200, the wailing device 300, the steering device 400, and the like.

The storage 120 may store the sensing result of the sensor 200 and information obtained by the processor 140. The storage 120 may include at least one type of a storage medium among a flash memory type of a memory, a hard disk type of a memory, a micro type of a memory, and a card type (e.g., a Secure Digital (SD) card or an eXtreme Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disk type of a memory.

The display device 130 may display a parking space, a target parking space, a virtual object, an image of a surrounding vehicle, an image of the vehicle, or the like during a parking control mode.

Upon generating the parking trajectory, the display device 130 may display the fact that the scan of the next parking space of an object has been completed. In addition, the display device 130 may display the fact that the parking space before object has been found, upon scanning the space before the object and may preferentially display a screen in which the scan of the next parking space of the previous object is completed, prior to a screen in which the parking space before a new object is found. Furthermore, the display device 130 may display a screen in which the scan of the parking space before an object is completed, upon generating the trajectory of the parking space before the new object, and may preferentially display a screen in which the scan of the parking space before the new object is completed, prior to a screen in which the scan of the next parking space of the previous object is completed.

The display device 130 may be implemented with a Head Up Display (HUD), a cluster, an Audio Video Navigation (AVN), or the like. In addition, the display device 130 may directly receive a color input from a user through a User Setting Menu (USM) menu of a cluster. Furthermore, the display device 130 may include at least one of a Liquid Crystal Display (LCD), a Thin Film Transistor-LCD (TFT LCD), a Light Emitting Diode (LED) display, an Organic LED (OLED) display, an Active Matrix OLED (AMOLED) display, a flexible display, a bended display, and a 3D display. Some of the displays may be implemented with a transparent display that is transparent or optically transparent to view the outside. Moreover, the display device 130 may be provided as a touchscreen including a touch panel and may be used as an input device in addition to an output device.

The processor 140 may be electrically connected to the communication device 110, the storage 120, the display device 130, or the like, may electrically control each of the components. The processor 140 may be an electrical circuit that executes instructions of software, and may perform various data processing and calculation described below.

The processor 140 determines whether to generate a virtual object, depending on the length of a parking space and the current location of the vehicle when a parking space between the first object and the second object is scanned, determines a parking target space in the parking space based on the virtual object upon generating the virtual object, and generates a parking trajectory such that the vehicle is parked to the parking target space, to perform the parking control based on the parking trajectory.

The processor 140 may determine that the entire scanned parking space is a parking target space, when the length of the parking space between the first object and the second object is less than the predetermined reference value.

The processor 140 may determine a parking target space in a parking space such that the vehicle is parked within a specific distance from an object with the least number of parking steps upon controlling the parking at the current location of the vehicle, when the length of a parking space between the first object and the second object is greater than the predetermined reference value.

The processor 140 may determine that the parking space includes a first parking space adjacent to the first object and a second parking space located between the first parking space and the second object, when the length of the parking space between the first object and the second object is greater than the predetermined reference value.

The processor 140 may generate a virtual object in the second parking space and may determine that the first parking space is the parking target space, when the current location of the vehicle is located before the second object.

The processor 140 may determine that the second parking space is the parking target space, when the current location of the vehicle is located next to or after the second object.

The processor 140 may determine the location of the virtual object depending on whether a curb or a wall is present and the slope direction of the first object.

The processor 140 may determine a location, which moves from the first object in the direction of the curb or the wall by the overall length or the overall width of the vehicle, as the X-coordinate of the virtual object, may determine a location, which moves from the curb in a direction perpendicular to the curb or the wall by the overall width or the overall length of the vehicle, as the Y-coordinate of the virtual object, and may determine the angle of the virtual object by using the direction of the curb or the wall, when a curb or a wall is present.

The processor 140 may extract the slope of the first object to determine a location, which moves in the slope direction of the first object at each corner point of the first object by the overall length or the overall width of the vehicle, as the X-coordinate of the virtual object, may determine a location the same as each corner point of the first object in the slope direction of the first object, as the Y-coordinate of the virtual object, and may determine the angle of the virtual object by using the slope of the first object, when the curb or the wall is not present.

The processor 140 may determine a location, which moves in the space scan direction of the vehicle from each corner point of the first object by the overall length or the overall width of the vehicle, as the X-coordinate of the virtual object, may determine a location the same as each coiner point of the first object in the space scan direction of the vehicle, as the Y-coordinate of the virtual object, and may determine the angle of the virtual object by using the space scan direction of the vehicle, when the curb or the wall is not present and it is impossible to extract the slope of the first object.

The processor 140 may generate the parking trajectory based on the first object and the virtual object. Furthermore, the processor 140 may generate a plurality of parking trajectories by using at least one or more of the steering ratio of a vehicle, the current location of the vehicle, and a parking target space, may extract a trajectory, in which the first object and the second object do not collide with the vehicle, from among the plurality of parking trajectories, and may select a trajectory with the shortest route among the extracted trajectories.

The sensor 200 may include a plurality of sensors for sensing an object outside the vehicle, and may obtain information about the location of an external object, the speed of the external object, the movement direction and/or the type of the external object (e.g., a vehicle, a pedestrian, a bicycle, a motorcycle, or the like). To this end, the sensor 200 may include an ultrasonic sensor, radar, a camera, a laser scanner and/or corner radar, a LiDAR, an acceleration sensor, a yaw rate sensor, a torque measurement sensor, and/or a wheel speed sensor, and etc. In the present disclosure, it is possible to scan a parking space by using only an ultrasonic sensor, and it is possible to obtain an image for parking control using a camera. Referring to FIG. 2, the ultrasonic sensor is mounted on the left and right sides of a vehicle to scan the parking space of the near distance, and may be mounted on the front and rear of the vehicle as needed.

The warning device 300 may make a warning by outputting a warning sound or by turning on and off the headlight or the emergency light, when the vehicle parking controlling apparatus 100 determines the speed of the surrounding vehicle, the risk of collision, and the like.

The steering device 400 may be controlled by the vehicle parking controlling apparatus 100 to drive vehicle steering for parking control.

Hereinafter, a method for determining whether to generate a virtual object and a method for generating a virtual object will be described with reference to FIGS. 3 to 7 in detail.

Figure 3:
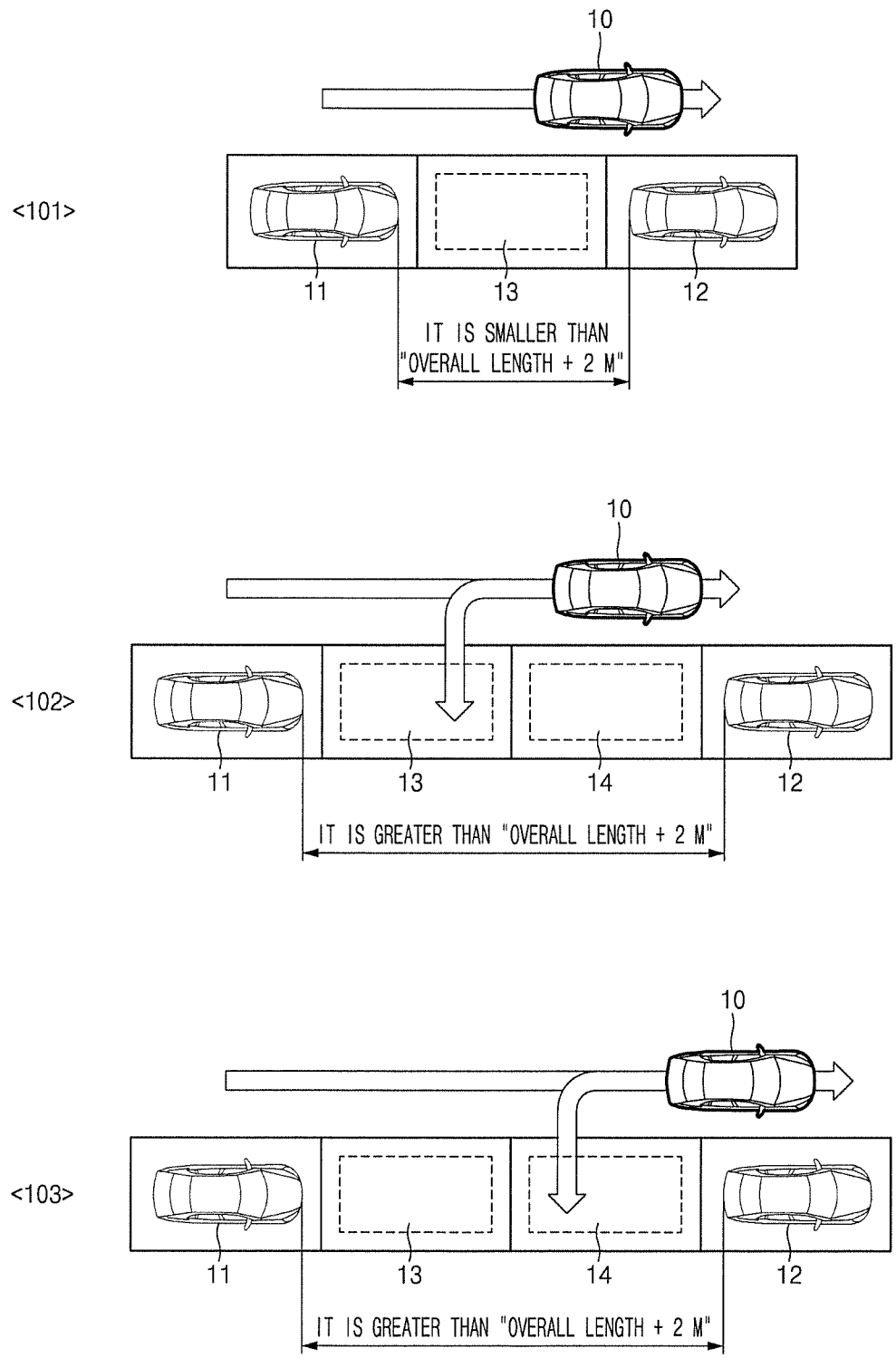
FIG. 3 is a view for describing a reference for determining a parking location upon controlling parallel parking, according to an embodiment of the present disclosure.

FIG. 3 is a view for describing a reference for determining a parking location upon controlling parallel parking, according to an embodiment of the present disclosure.

The vehicle parking controlling apparatus 100 may determine whether the length of the scanned parking space is greater or less than "the overall length of a vehicle +2 m", when a vehicle enters a parking lot to scan a parking space. Referring to '101' of FIG. 3, the length of the scanned parking space may mean the length of a space between a first object 11 and a second object 12, that is, a distance between the front of the first object 11 and the rear of the second object 12.

'101' of FIG. 3 illustrates that the length of the scanned parking space is less than "the overall length of a vehicle +2 m", and the parking space between the first object 11 and the second object 12 may correspond to a space capable of parking one vehicle; the vehicle parking controlling apparatus 100 performs parking control such that a vehicle parks in a corresponding space 13 with respect to the first object 11 and the second object 12.

'102' of FIG. 3 illustrates that the length of the scanned parking space is greater than "the overall length of a vehicle +2 m" and the vehicle 10 is located just before the second object 12. At this time, the parking step in the case of parking in a parking space 13 is shorter than the step in the case of parking in the parking space 14. Accordingly, the vehicle parking controlling apparatus 100 may determine that the parking space 13 is a parking location. However, since the parking space 13 is not a space just before the first object 11 or the second object 12 but the next space of the first object 11, a virtual object needs to be generated in the parking space 14 such that parking control is possible. As such, after the vehicle parking controlling device 100 generates a virtual object in the parking space 14 and generates the parking space 13 as a parking target space, the vehicle parking controlling device 100 may generate a parking trajectory based on the virtual object and the first object 11.

'103' of FIG. 3 illustrates that the length of the scanned parking space is greater than "the overall length of a vehicle +2 m" and the vehicle 10 is located next to the second object 12. At this time, the parking step in the case of parking in the parking space 14 is shorter than the step in the case of parking in the parking space 13, when the vehicle 10 is located next to the second object 12. Accordingly, the vehicle parking controlling apparatus 100 determines that the parking space 14 is the parking location, and generates the parking trajectory based on the second object 12. At this time, since the parking space 14 corresponds to the space just before the second object 12, it is possible to generate a parking trajectory based on the second object 12, and thus there is no need to generate a virtual object. At this time, the vehicle parking controlling apparatus 100 may determine that a vehicle has advanced to the periphery of the side of the second object 12 when the vehicle scans the parking space of the next space of the second object 12 as well as the vehicle parking controlling apparatus 100 determines the location of the vehicle through a navigation device or the like for the purpose of determining whether the current location of the vehicle is the periphery of the side of the second object 12. Furthermore, on vehicle parking in '102' and '103' of FIG. 3, it is favorable to generate a parking trajectory so as to maintain an interval of 1.5 m from the object. However, 1.5 m may be changed as needed.

Figure 4:
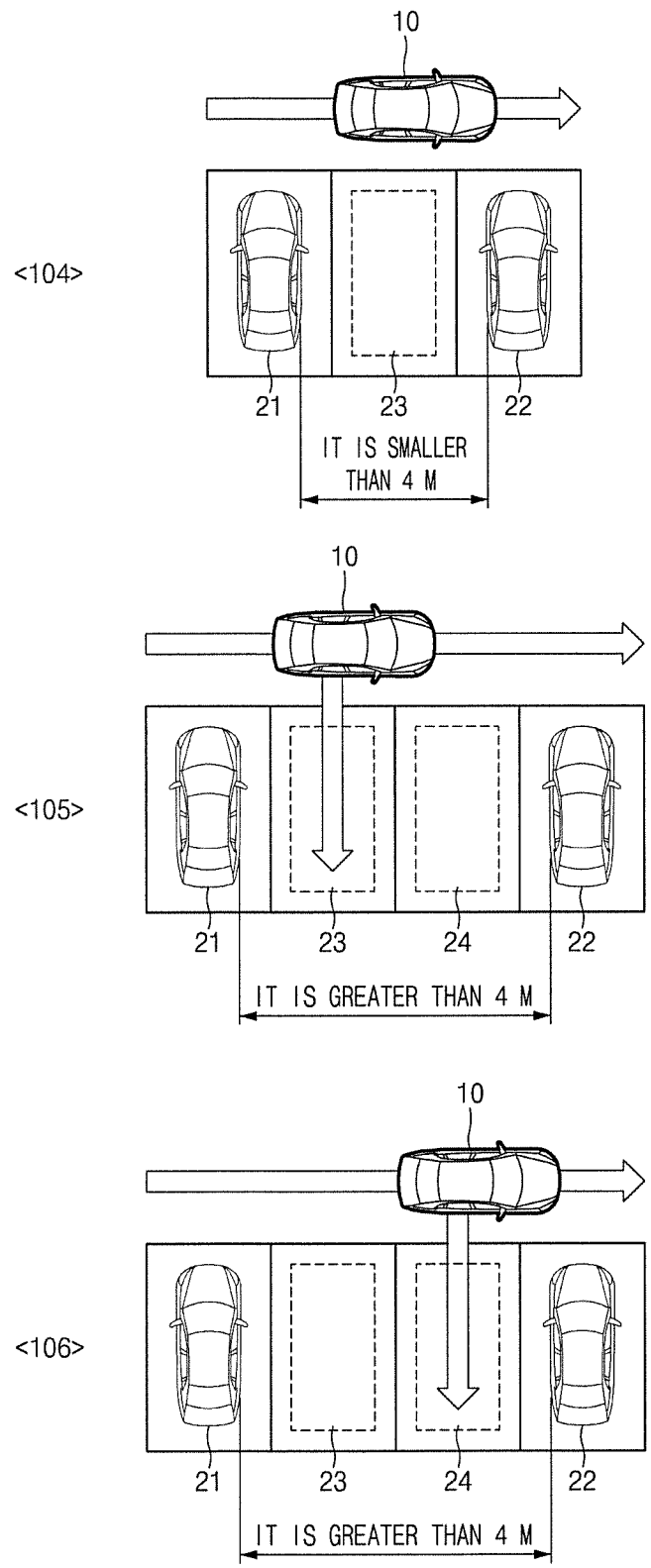
FIG. 4 is a view for describing a reference for determining a parking location upon controlling perpendicular parking, according to an embodiment of the present disclosure.

FIG. 4 is a view for describing a reference for determining a parking location upon controlling perpendicular parking, according to an embodiment of the present disclosure.

'104' of FIG. 4 illustrates that the length of the scanned parking space is less than 4 m of a vehicle, and a parking space between a first object 21 and a second object 22 may correspond to a space capable of parking one vehicle; the vehicle parking controlling apparatus 100 performs parking control such that a vehicle parks in a corresponding space 23 with respect to the first object 21 and the second object 22. At this time, the length of the scanned parking space may mean the length of a space between the right side surface of the first object 21 and the left side surface of the second object 22. In addition, '4 m' being the reference for determining the length of the parking space is not limited, but may be changed by experiment as needed; especially, the reference may be set to be greater than 4 m in the parking space for the disabled, the charging space for an electric car, and the like.

'105' of FIG. 4 illustrates that the length of the scanned parking space is greater than 4 m and the vehicle 10 is located at the location before the second object 22. At this time, the parking step in the case of parking in a parking space 23 is shorter than the step in the case of parking in the parking space 24. Accordingly, the vehicle parking controlling apparatus 100 may determine that the parking space 23 is a parking location. However, since the parking space 23 is not a space just before the first object 21 or the second object 22 but the next space of the first object 21, a virtual object needs to be generated in the parking space 24 such that parking control is possible. As such, after the vehicle parking controlling device 100 generates a virtual object in the parking space 24 and generates the parking space 23 as a parking target space, the vehicle parking controlling device 100 may generate a parking trajectory based on the virtual object and the first object 21.

'106' of FIG. 4 illustrates that the length of the scanned parking space is greater than 4 m of a vehicle and the vehicle 10 is located at a periphery of the side of the second object 22. At this time, the parking step in the case of parking in the parking space 24 is shorter than the step in the case of parking in the parking space 23, when the vehicle 10 is located next to the second object 22. Accordingly, the vehicle parking controlling apparatus 100 determines that the parking space 24 is the parking location, and generates the parking trajectory based on the second object 22. At this time, since the parking space 24 corresponds to the space just before the second object 22, it is possible to generate a parking trajectory based on the second object 22, and thus there is no need to generate a virtual object.

It is favorable to generate the parking trajectory such that the car 10 maintains an interval of 0.35 m to 0.65 m with the surrounding object during perpendicular parking as illustrated in '105' and '106' of FIG. 4. At this time, the interval of 0.35 m to 0.65 m may be adjusted to a width capable of getting off after parking, as needed.

Figure 5A:
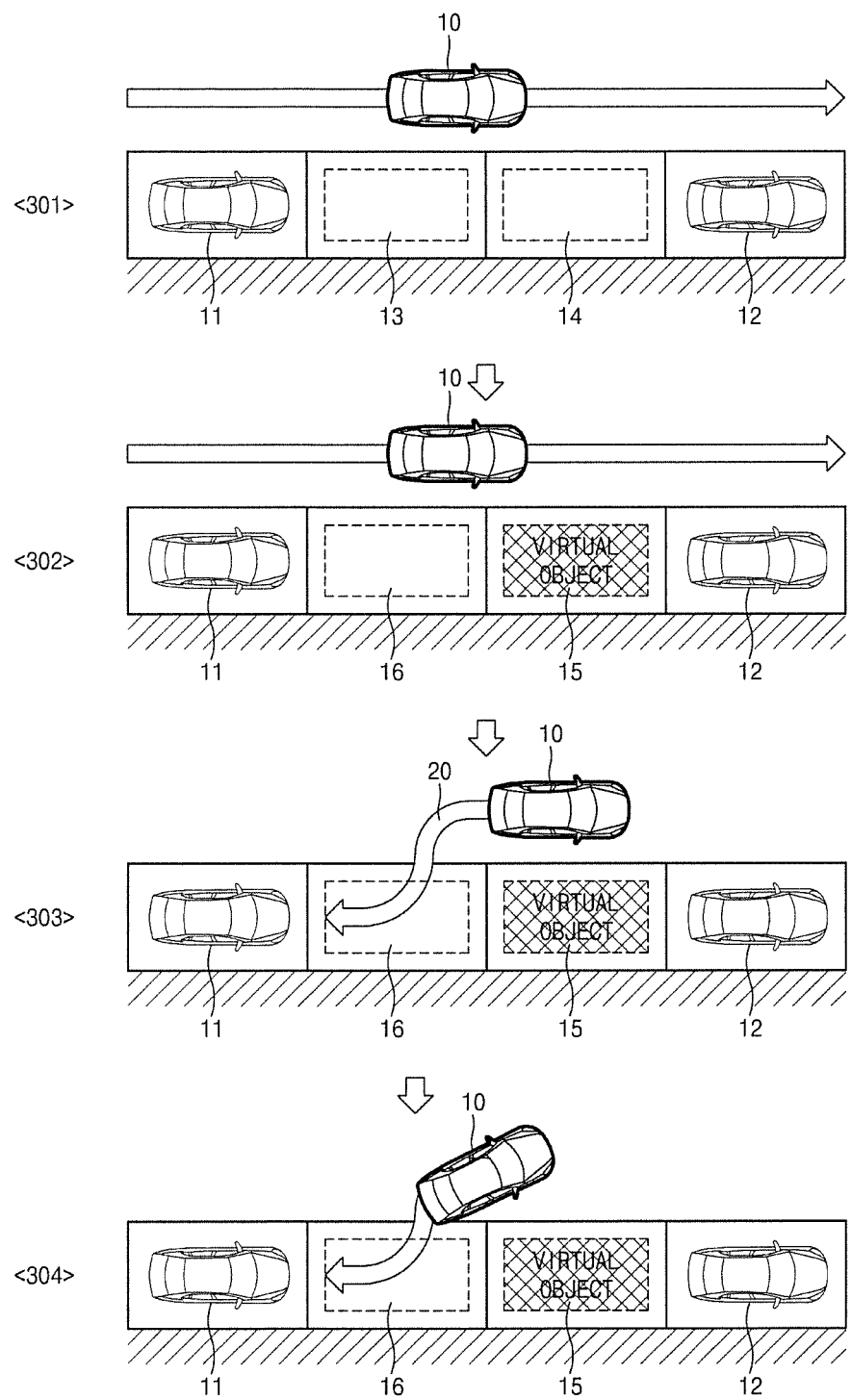
FIG. 5A is a view for describing a method for performing parking control by setting a next parking space of a first object to a target parking space upon controlling parallel parking, according to an embodiment of the present disclosure.

FIG. 5A is a view for describing a method for performing parking control by setting a next parking space of a first object 11 to a target parking space upon controlling parallel parking, according to an embodiment of the present disclosure. That is, FIG. 5A illustrates that the length of the parking space scanned in '102' of FIG. 3 is greater than "the overall length of a vehicle +2 m" and the vehicle 10 is located just before the second object 12; and FIG. 5A illustrates that parking control is performed by generating a virtual object 15 to generate a parking trajectory.

'301' of FIG. 5A illustrates that two parking spaces 13 and 14 between the first object 11 and the second object 12 are scanned; '302' of FIG. 5A illustrates that a virtual object 15 is generated in the parking space 14 next to a target parking space 16.

Afterwards, '303' illustrates that a parking trajectory 20 is generated with respect to the virtual object 15 and the first object 11; and '304' illustrates that the parking control is performed depending on the parking trajectory.

At this time, the vehicle parking controlling apparatus 100 may generate the virtual object 15 assuming that there is no curb or wall, when a curb or a wall is present.

1) A method for determining the location of a virtual object when a curb/wall is present.
   X-location: the location of "the overall length of the vehicle +(1 m)" in the curb/wall direction from the first object 11.
   Y-location: the location of "the width of the vehicle +(0.4 m)" in the direction perpendicular to the curb/wall from the curb.
   Angle: the direction of the curb/wall 2) The location of a virtual object when a curb/wall is not present.
   2-1) a method for determining the location of a virtual object when it is possible to extract the slope of the first object 11 and an angle between the slope and the driving direction of the vehicle is less than 3 degrees.
   X-location: the location of "the overall length of the vehicle +(1 m)" in the slope direction of the first object 11 from the corner point of the first object 11.
   Y-location: the location the same as the coiner point of the first object 11 in the slope direction of the first object 11.
   Angle: the slope of the first object 11.
   2-2) a method for determining the location of a virtual object when the slope of the first object 11 is greater than 3 degrees and it is impossible to extract the slope of the first object 11.
   X-location: the location of "the overall length of the vehicle +(1 m)" in the space scan direction of the vehicle from the corner point of the first object 11.
   Y-location: the location the same as the corner point of the first object 11 in the space scan direction of the vehicle.
   Angle: the space scan direction of the vehicle.

As described above, on parallel parking, the vehicle parking controlling apparatus 100 may determine the coordinates (X, Y) and the angle of a virtual object depending on the case where a curb/wall is present, the case where the curb/wall is not present, it is possible to extract the slope of the first object 11, and an angle between the slope and the driving direction of the vehicle is less than 3 degrees, or the case where the curb/wall is not present, an angle between the slope and the driving direction of the vehicle is greater than 3 degrees, or it is impossible to extract the slope of the first object 11.

Figure 5B:
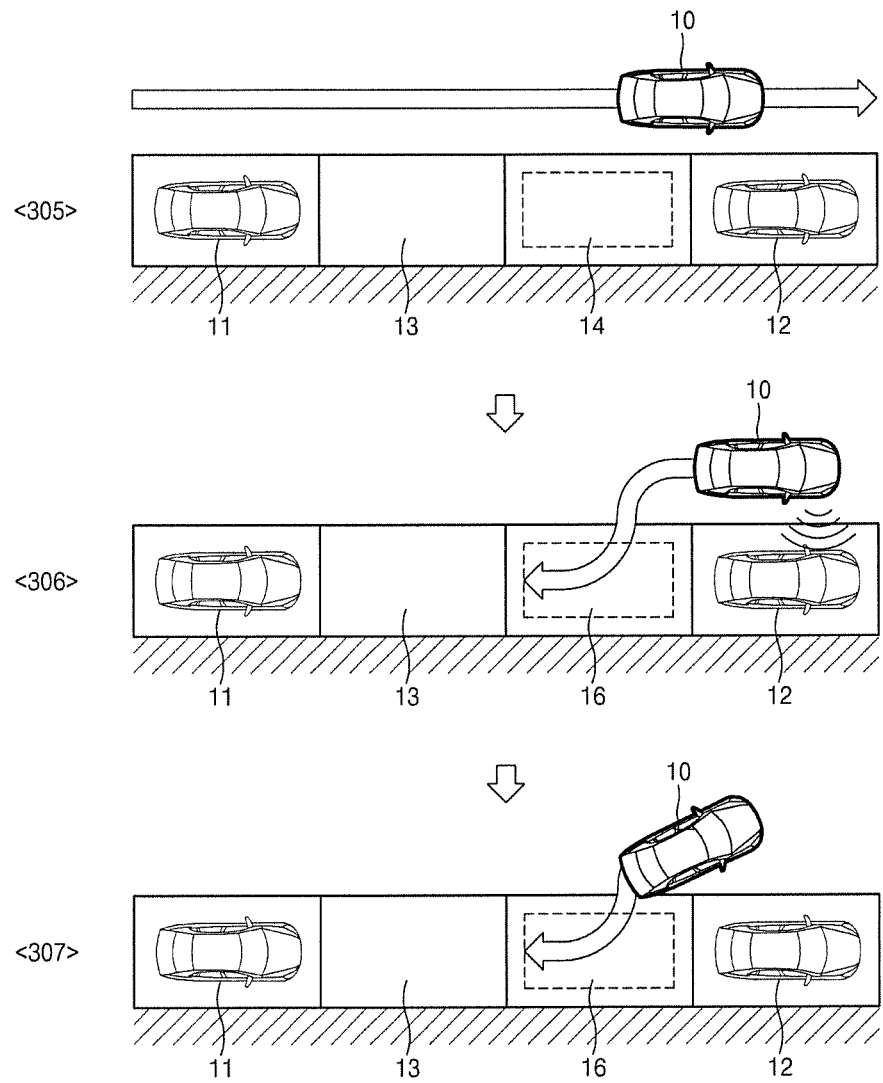
FIG. 5B is a view for describing a method for performing parking control by setting a parking space before a second object to a target parking space upon controlling parallel parking, according to an embodiment of the present disclosure.

FIG. 5B is a view for describing a method for performing parking control by setting a parking space before a second object 12 to a target parking space upon controlling parallel parking, according to an embodiment of the present disclosure. That is, FIG. 5B illustrates that the length of the parking space scanned in '103' of FIG. 3 is greater than "the overall length of a vehicle +2 m" or the vehicle 10 is located at the periphery of the side of the second object 12; and FIG. 5B illustrates that parking control is performed by generating a parking trajectory without generating a virtual object, because a target parking space corresponds to the space just before the second object 12.

Referring to '305' of FIG. 5B, as illustrated in '306', after determining that the parking space 14, which is a space just before the second object 12, from among the two parking spaces 13 and 14 is the parking target space 16, the vehicle parking controlling apparatus 100 generates a parking trajectory for controlling the parking to the parking target space 16, when the two parking spaces 13 and 14 between the first object 11 and the second object 12 are scanned and the vehicle is located next to the second object 12. As such, as illustrated in '307', the vehicle parking controlling apparatus 100 performs parking control to the parking target space 16 depending on the parking trajectory. At this time, the parking trajectory may be generated using the curb, the second object 12, or the like without the need for a virtual object. The vehicle parking controlling apparatus 100 may generate a trajectory aligned with respect to a curb, when the curb is located across an object; alternatively, the vehicle parking controlling apparatus 100 may generate a trajectory aligned with respect to the location and the slope of the second object 12, when there is no curb and it is possible to extract the slope of the second object 12. Furthermore, the vehicle parking controlling apparatus 100 may generate a trajectory aligned with respect to the scan direction, when there is no curb and it is impossible to extract the slope of the second object 12.

Figure 6A:
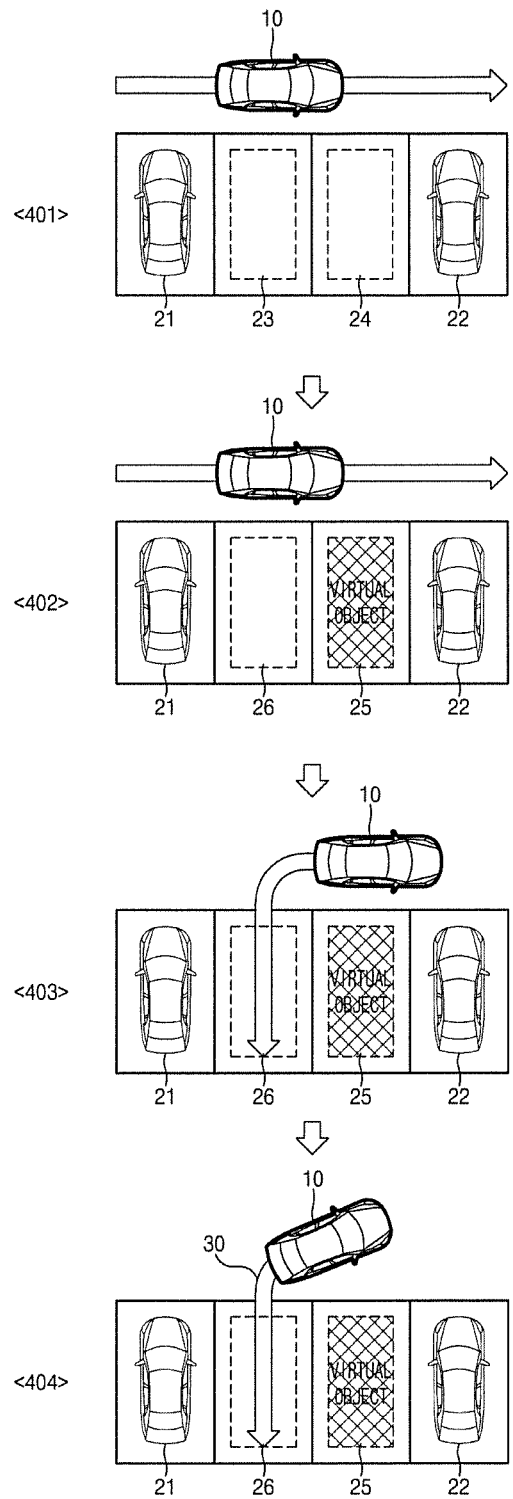
FIG. 6A is a view for describing a method for performing parking control by setting a next parking space of a first object to a target parking space upon controlling perpendicular parking, according to an embodiment of the present disclosure.

FIG. 6A is a view for describing a method for performing parking control by setting a next parking space of a first object to a target parking space upon controlling perpendicular parking, according to an embodiment of the present disclosure. That is, FIG. 6A illustrates that the length of the scanned parking space is greater than 4 m of a vehicle and the vehicle 10 is located just before the second object 22 in '105' of FIG. 4; and FIG. 5A illustrates that parking control is performed by generating a virtual object to generate a parking trajectory.

'401' of FIG. 6A illustrates that two parking spaces 23 and 24 between the first object 21 and the second object 22 are scanned; '402' of FIG. 5A illustrates that a virtual object 25 is generated in the parking space 24 next to a target parking space 26.

Afterwards, '403' illustrates that a parking trajectory 30 is generated with respect to the virtual object 25 and the first object 21; and '404' illustrates that the parking control is performed depending on the parking trajectory.

At this time, the vehicle parking controlling apparatus 100 may generate the virtual object 25 assuming that there is no curb or wall, when a curb or a wall is present.

1) A method for determining the location of a virtual object when a curb/wall is present.

X-location: the location of "the overall width of the vehicle +(0.8 m)" in the curb/wall direction from the first object 21.

Y-location: the location of the overall length of the vehicle in the direction perpendicular to the curb/wall from the curb.

Angle: a direction perpendicular to the curb/wall.

2) A method for determining the location of a virtual object when a curb/wall is not present.

2-1) a method for determining the location of a virtual object when it is possible to extract the slope of the first object 21.

X-location: the location of "the overall width of the vehicle +(0.8 m)" in the slope direction of the first object 21 from the corner point of the first object 21.

Y-location: the location the same as the corner point of the first object 21 in the slope direction of the first object 21.

Angle: a direction perpendicular to the slope of the first object 21.

2-2) a method for determining the location of a virtual object when it is impossible to extract the slope of the first object 21.

X-location: the location of "the overall width of the vehicle +(0.4 m)" in the space scan direction of the vehicle from the corner point of the first object 21.

Y-location: the location the same as the corner point of the first object 21 in the space scan direction of the vehicle.

Angle: a direction perpendicular to the space scan direction of the vehicle.

As described above, in perpendicular parking, the vehicle parking controlling apparatus 100 may determine the coordinates (X, Y) and the angle of a virtual object depending on the case where a curb/wall is present, the case where the curb/wall is not present and it is possible to extract the slope of the first object 21, or the case where the curb/wall is not present and it is impossible to extract the slope of the first object 21.

Figure 6B:
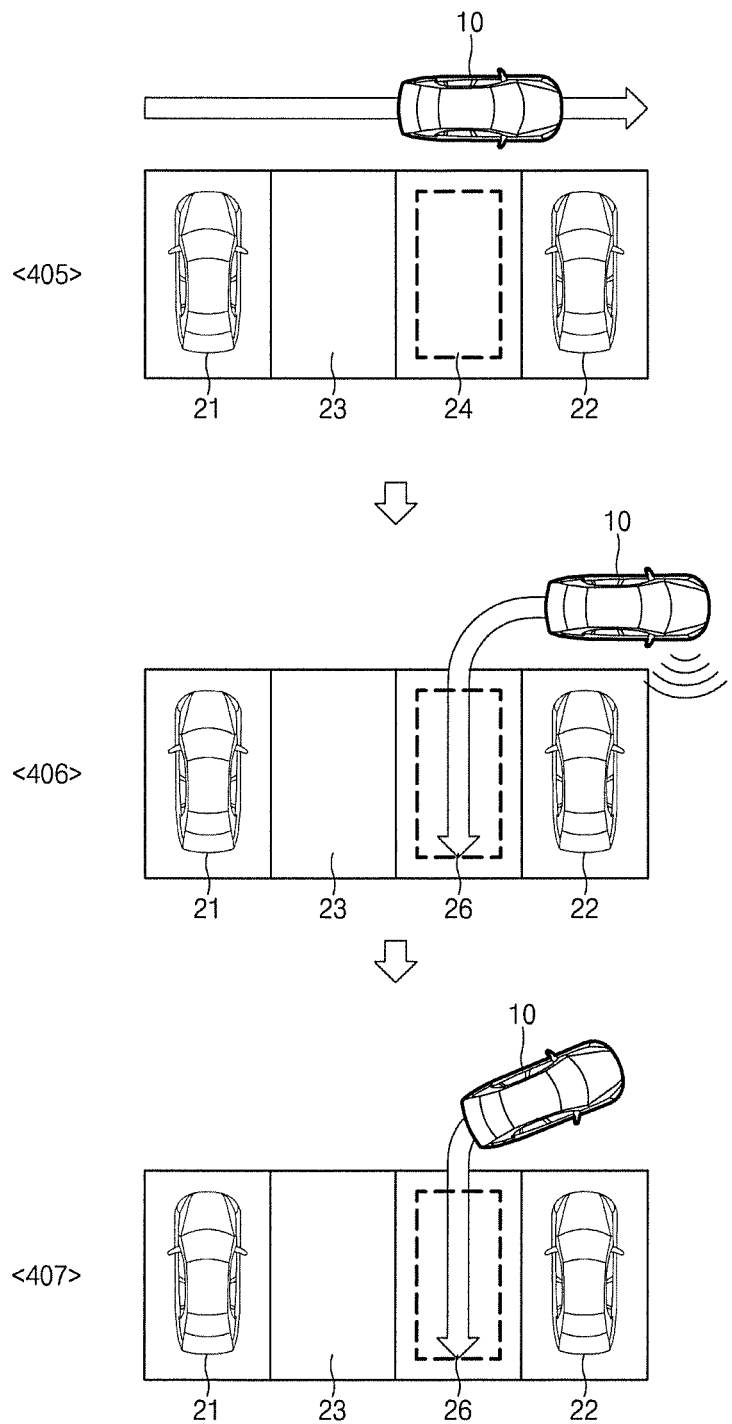
FIG. 6B is a view for describing a method for performing parking control by setting a parking space before a second object to a target parking space upon controlling perpendicular parking, according to an embodiment of the present disclosure.

FIG. 6B is a view for describing a method for performing parking control by setting a parking space before a second object 22 to a target parking space upon controlling perpendicular parking, according to an embodiment of the present disclosure. That is, FIG. 6B illustrates that the length of the scanned parking space is greater than 4 m of a vehicle or the vehicle 10 is located at a periphery of the side of the second object 22 in '106' of FIG. 4; and FIG. 6B illustrates that parking control is performed by generating a parking trajectory without generating a virtual object, because a target parking space corresponds to the space just before the second object 22.

Referring to '405' of FIG. 6B, as illustrated in '406', after determining that the parking space 24, which is a space just before the second object 22, from among two parking spaces 23 and 24 is the parking target space 26, the vehicle parking controlling apparatus 100 generates a parking trajectory for controlling the parking to the parking target space 26, when two parking spaces 23 and 24 between the first object 21 and the second object 22 are scanned and the vehicle 10 is located next to the second object 22. As such, as illustrated in '407', the vehicle parking controlling apparatus 100 performs parking control to the parking target space 26 depending on the parking trajectory. At this time, the parking trajectory may be generated using the curb, the second object 22, or the like without the need for a virtual object. The vehicle parking controlling apparatus 100 may generate a trajectory aligned with respect to a curb, when the curb is located across an object; alternatively, the vehicle parking controlling apparatus 100 may generate a trajectory aligned with respect to the location and the slope of the second object 22, when there is no curb and it is possible to extract the slope of the second object 22. Furthermore, the vehicle parking controlling apparatus 100 may generate a trajectory aligned with respect to the scan direction, when there is no curb and it is impossible to extract the slope of the second object 22.

Figure 7:
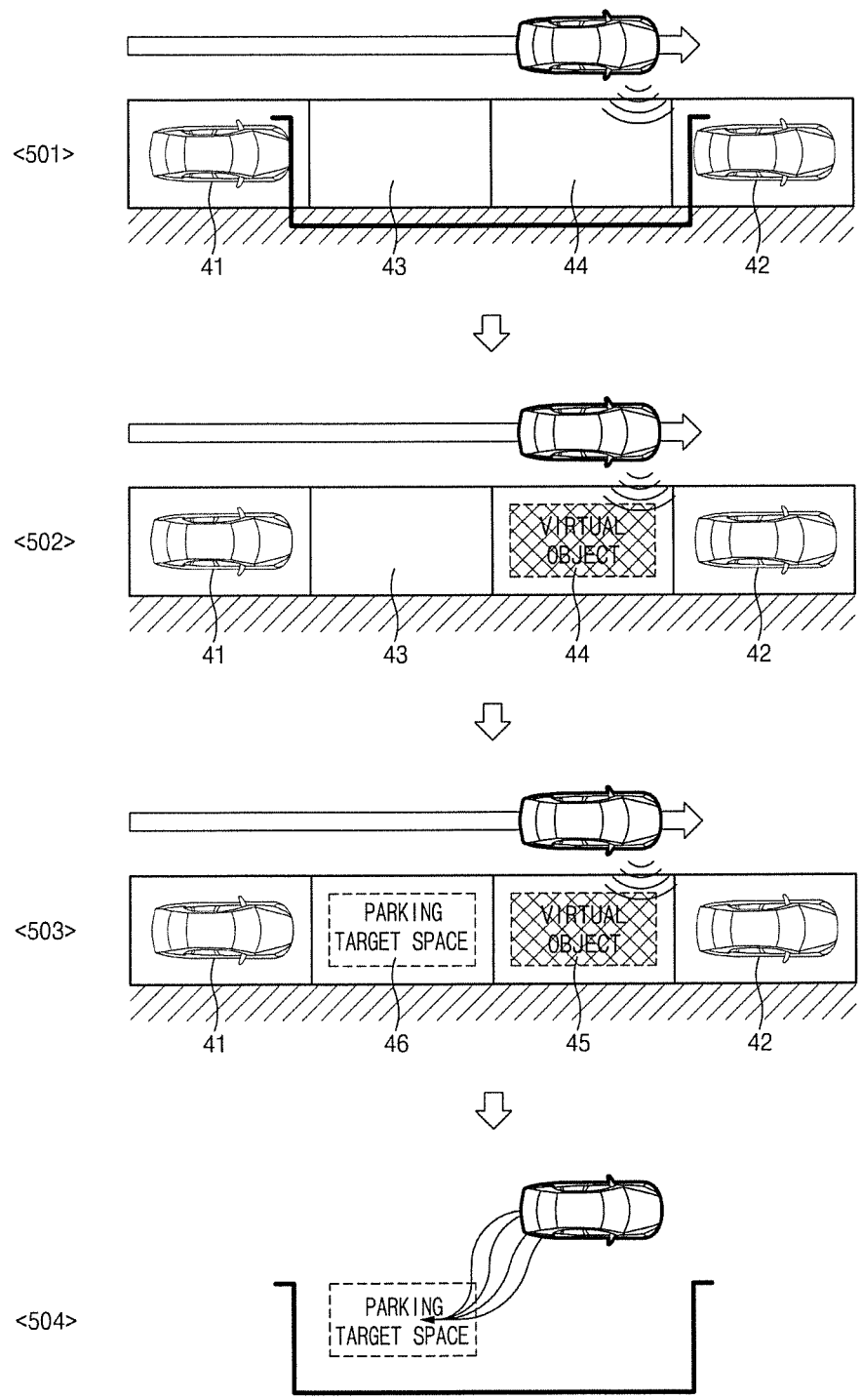
FIG. 7 is a view for describing a method for controlling parking of a vehicle, according to another embodiment of the present disclosure.

FIG. 7 is a view for describing a method for controlling parking of a vehicle, according to another embodiment of the present disclosure.

'501' of FIG. 7 illustrates that two parking spaces 43 and 44 between the first object 41 and the second object 42 are scanned; '502' of FIG. 7 illustrates that a virtual object 45 is generated in the parking space 44 next to a space 43 for performing parking. The vehicle parking controlling apparatus 100 may generate the virtual object 45 by using the first object 41, a curb, the location of a wall, a slope, a scan direction, and the like.

Afterwards, '503' illustrates that the space 43, which is located next to the virtual object 45 and in which the parking is performed, is generated as a parking target space 46; '504' illustrates that a plurality of parking trajectories are generated. That is, the vehicle parking controlling apparatus 100 may control a vehicle so as to be parked to a parking target space generated from the current location of the vehicle, and may generate a trajectory for controlling the parking of a vehicle while avoiding only the scanned object. Furthermore, the vehicle parking controlling apparatus 100 may generate a plurality of trajectories depending on the usage of the steering ratio, by using the steering ratio of the known vehicle, the wheelbase, the current location of the vehicle, the parking target space, and the like. The vehicle parking controlling apparatus 100 extracts at least one or more trajectories, in each of which an object scanned by identifying the known specification of the outer surface of a vehicle does not collide with the vehicle, from among the generated plurality of trajectories and selects and follows a trajectory with the shortest route among the plurality of trajectories in each of which there is no collision.

Figure 8:
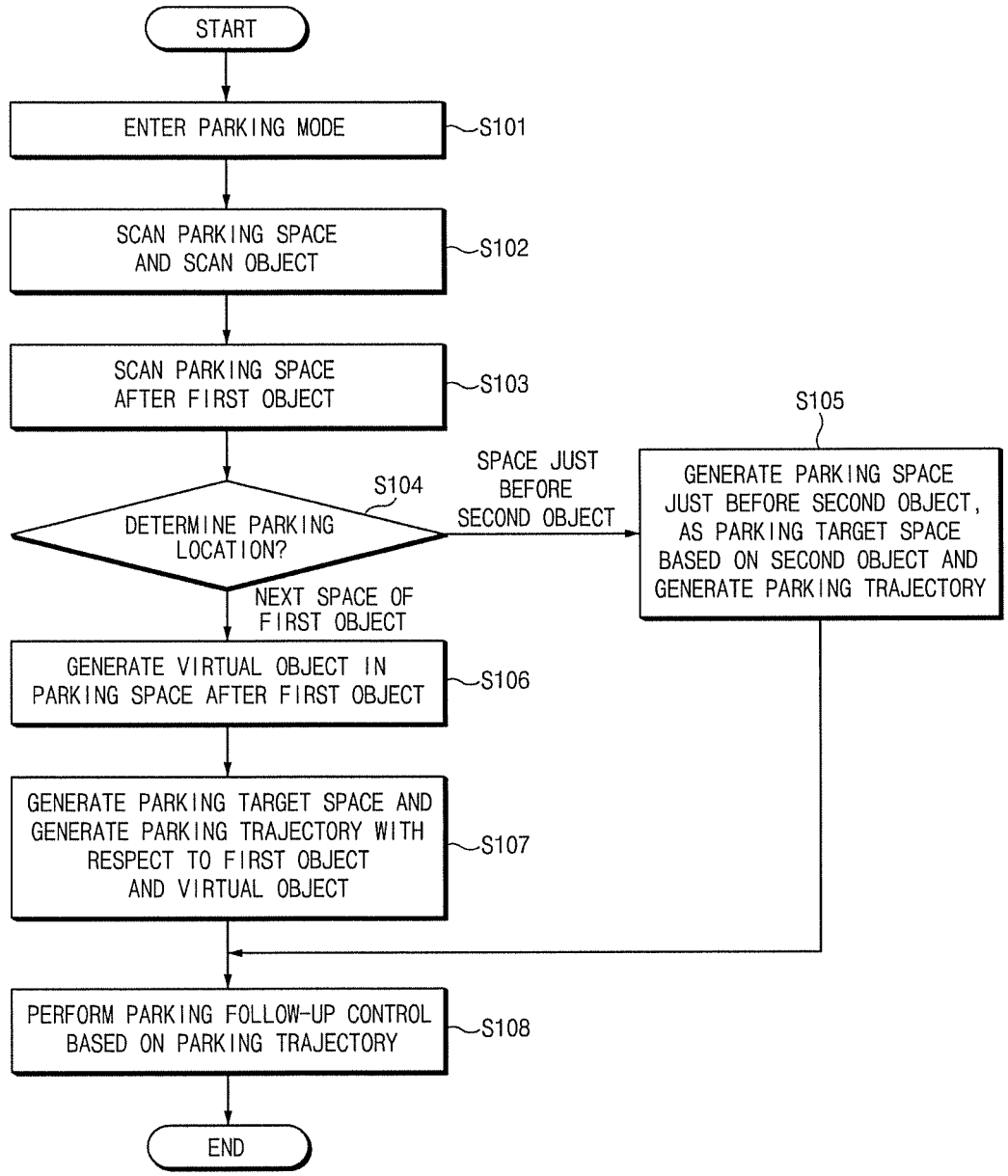
FIG. 8 is a flowchart for describing a method for controlling parking of a vehicle, according to an embodiment of the present disclosure.

Hereinafter, according to an embodiment of the present disclosure, a method for controlling the parking of a vehicle will be described in detail with reference to FIG. 8. FIG. 8 is a flowchart for describing a method for controlling parking of a vehicle, according to an embodiment of the present disclosure. Hereinafter, it is assumed that the vehicle parking controlling apparatus 100 of FIG. 1 performs the process of FIG. 8. In addition, as described in FIG. 8, it is understood that the operation described as being executed by the apparatus 100 is controlled by the processor 140 of the apparatus 100.

Referring to FIG. 8, in operation S102, the vehicle parking controlling apparatus 100 scans a parking space through the sensor 200 and scans an object (a surrounding vehicle), when a vehicle enters a parking mode in operation S101.

After the vehicle parking controlling apparatus 100 scans a parking space after the location of the first object sensed by the sensor 200 in operation S103, the vehicle parking controlling apparatus 100 determines the parking location in the scanned parking space depending on the size of the parking space, the parking space, and the current location of the vehicle in operation S104. Referring to FIG. 3, during parallel parking, the vehicle parking controlling apparatus 100 determines that the corresponding location is a parking location, when the length of a parking space between the first object and the second object is less than "the overall length +2 m"; during parallel parking, the vehicle parking controlling apparatus 100 determines that there are two parking spaces and determines that one of the two parking spaces is a parking location depending on the location of the vehicle, when the length of a parking space between the first object and the second object is greater than "the overall length +2 m". That that is, the step for parking differs depending on the location of the vehicle; since the vehicle parking controlling apparatus 100 may quickly perform parking as the control step for parking is shorter, the vehicle parking controlling apparatus 100 may determine that a space with the short step for parking is a parking location. As illustrated in '102', the vehicle parking controlling apparatus 100 determines that the parking space 13 being the next space of the first object is a parking location, in consideration of the parking step when the vehicle is located before the second object; as illustrated in '103', the vehicle parking controlling apparatus 100 determines that the parking space 14 being a space before the second object is the parking location, in consideration of the parking step when the vehicle is located next to the second object.

In operation S105, the vehicle parking controlling apparatus 100 generates the parking space just before the second object, as a parking target space based on the second object and generates a parking trajectory for following the parking to the parking target space, when determining that a space before the second object is the parking location in operation S104. As illustrated in '306' of FIG. 5B, the vehicle parking controlling apparatus 100 determines that the parking space 14 just before the second object 12 is the target parking space 16 and controls a vehicle so as to be parked to the target parking space 16.

In the meantime, in operation S106, the vehicle parking controlling apparatus 100 generates a virtual object in a space after the next space of the first object, that is, a parking space before the second object, when determining that the next space of the first object is a parking location in operation S104. Referring to FIG. 5A, the vehicle parking controlling apparatus 100 generates the virtual object 15 in the space 14 before the second object, when determining that the next space 13 of the first object among the two parking spaces 13 and 14 between the first object 11 and the second object 12 is a parking location.

In operation S107, the vehicle parking controlling apparatus 100 generates the parking target space with respect to the first object and the virtual object and generates the parking trajectory such that the parking is performed to the parking target space. As illustrated in '303' of FIG. 5A, the vehicle parking controlling apparatus 100 may generate a space between the first object 11 and the virtual object 15 as the parking target space 16 and may generate a trajectory 20 capable of following the parking to the parking target space 16.

Then, in operation S108, the vehicle parking controlling apparatus 100 may perform parking follow-up control depending on the generated parking trajectory.

Figure 9:
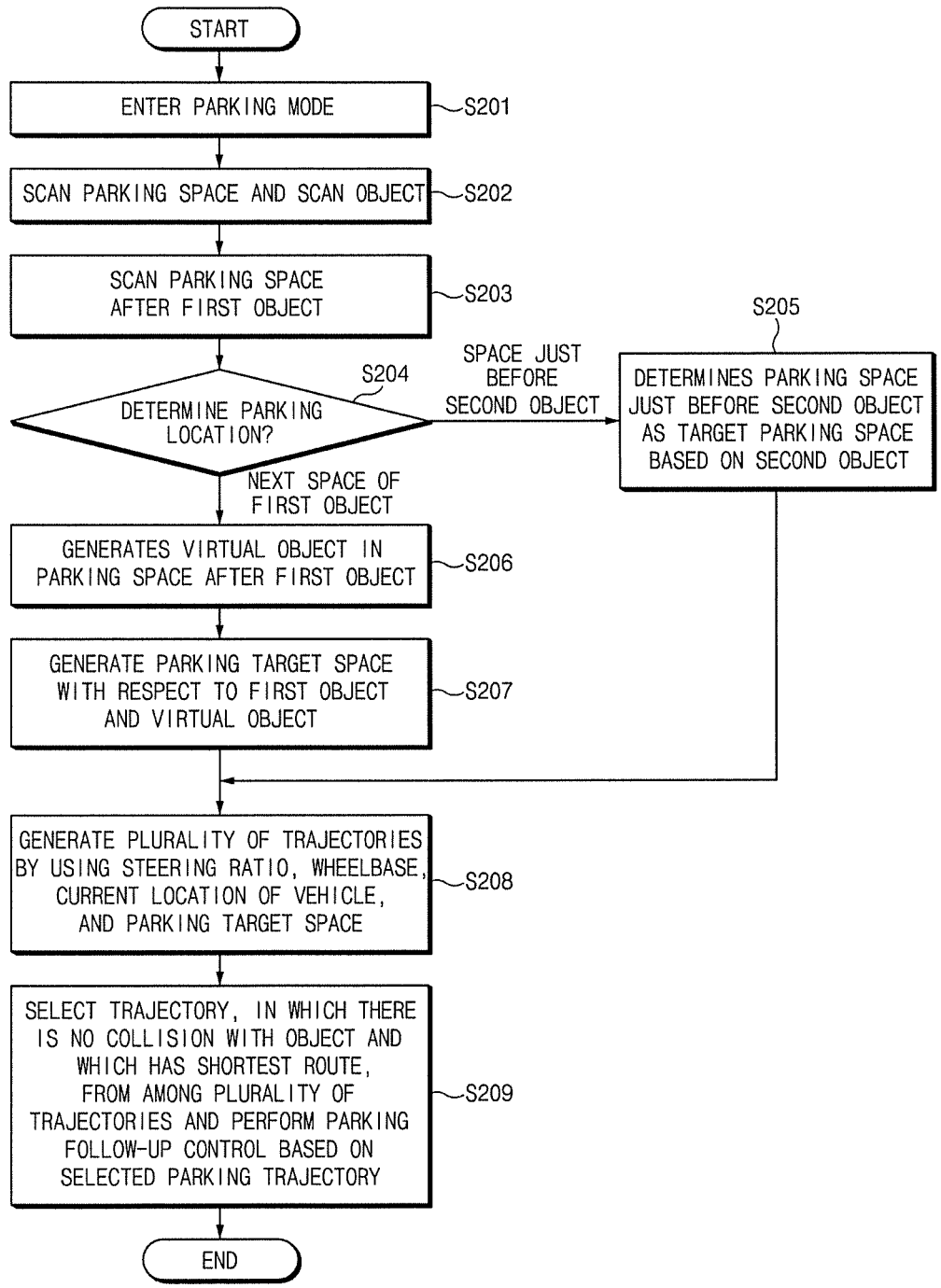
FIG. 9 is a flowchart for describing a method for controlling parking of a vehicle, according to another embodiment of the present disclosure.

Hereinafter, according to another embodiment of the present disclosure, a method for controlling the parking of a vehicle will be described in detail with reference to FIG. 9. FIG. 9 is a flowchart for describing a method for controlling parking of a vehicle, according to another embodiment of the present disclosure. Hereinafter, it is assumed that the vehicle parking controlling apparatus 100 of FIG. 1 performs the process of FIG. 9. In addition, as described in FIG. 9, it is understood that the operation described as being executed by the apparatus 100 is controlled by the processor 140 of the apparatus 100.

Referring to FIG. 9, in operation S202, the vehicle parking controlling apparatus 100 scans a parking space through the sensor 200 and scans an object (a surrounding vehicle), when a vehicle enters a parking mode in operation S201.

After the vehicle parking controlling apparatus 100 scans a parking space after the location of the first object sensed by the sensor 200 in operation S203, the vehicle parking controlling apparatus 100 determines the parking location in the scanned parking space depending on the size of the parking space, the parking space, and the current location of the vehicle in operation S204. Referring to FIG. 3, during parallel parking, the vehicle parking controlling apparatus 100 determines that the corresponding location is a parking location, when the length of a parking space between the first object and the second object is less than "the overall length +2 m"; during parallel parking, the vehicle parking controlling apparatus 100 determines that there are two parking spaces and determines that one of the two parking spaces is a parking location depending on the location of the vehicle, when the length of a parking space between the first object and the second object is greater than "the overall length +2 m". That that is, the step for parking differs depending on the location of the vehicle; since the vehicle parking controlling apparatus 100 may quickly perform parking as the control step for parking is shorter, the vehicle parking controlling apparatus 100 may determine that a space with the short step for parking is a parking location. As illustrated in '102', the vehicle parking controlling apparatus 100 determines that the parking space 13 being the next space of the first object is a parking location, in consideration of the parking step when the vehicle is located before the second object; as illustrated in '103', the vehicle parking controlling apparatus 100 determines that the parking space 14 being a space before the second object is the parking location, in consideration of the parking step when the vehicle is located next to the second object.

In operation S205, the vehicle parking controlling apparatus 100 generates the parking space just before the second object, as a parking target space based on the second object and generates a parking trajectory for following the parking to the parking target space, when determining that a space before the second object is the parking location in operation S204. As illustrated in '306' of FIG. 5B, the vehicle parking controlling apparatus 100 determines that the parking space 14 just before the second object 12 is the target parking space 16 and controls a vehicle so as to be parked to the target parking space 16.

In the meantime, in operation S206, the vehicle parking controlling apparatus 100 generates a virtual object in a space after the next space of the first object, that is, a parking space before the second object, when determining that the next space of the first object is a parking location in operation S204. Referring to '501' and '502' in FIG. 7, the vehicle parking controlling apparatus 100 generates the virtual object 45 in the space 44 before the second object, when determining that the next space 43 of the first object among two parking spaces 43 and 44 between the first object 41 and the second object 42 is a parking location.

In operation S207, the vehicle parking controlling apparatus 100 generates the parking target space with respect to the first object and the virtual object. As illustrated in '503' of FIG. 7, the vehicle parking controlling apparatus 100 may generate a space between the first object 41 and the virtual object 45 as the parking target space 46.

Then, in operation S208, the vehicle parking controlling apparatus 100 may generate a trajectory for parking while avoiding the scanned objects (the first object and the second object) and may generate a plurality of trajectories depending on the usage of the steering ratio, by using the steering ratio of a vehicle, the wheelbase location, the current location of the vehicle, and the parking target space. In '504' of FIG. 7, it is understood that a plurality of trajectories of the target parking space 46 are generated.

Afterwards, in operation S209, the vehicle parking controlling apparatus 100 extracts trajectories, in each of which an object scanned by identifying the known specification of the outer surface of a vehicle does not collide with a vehicle, from among the generated plurality of trajectories and selects and follows a trajectory with the shortest route among the plurality of trajectories in each of which there is no collision.

As such, the present disclosure may also support parking for the next parking space of an object, thereby enhancing a user's convenience.

Figure 10:
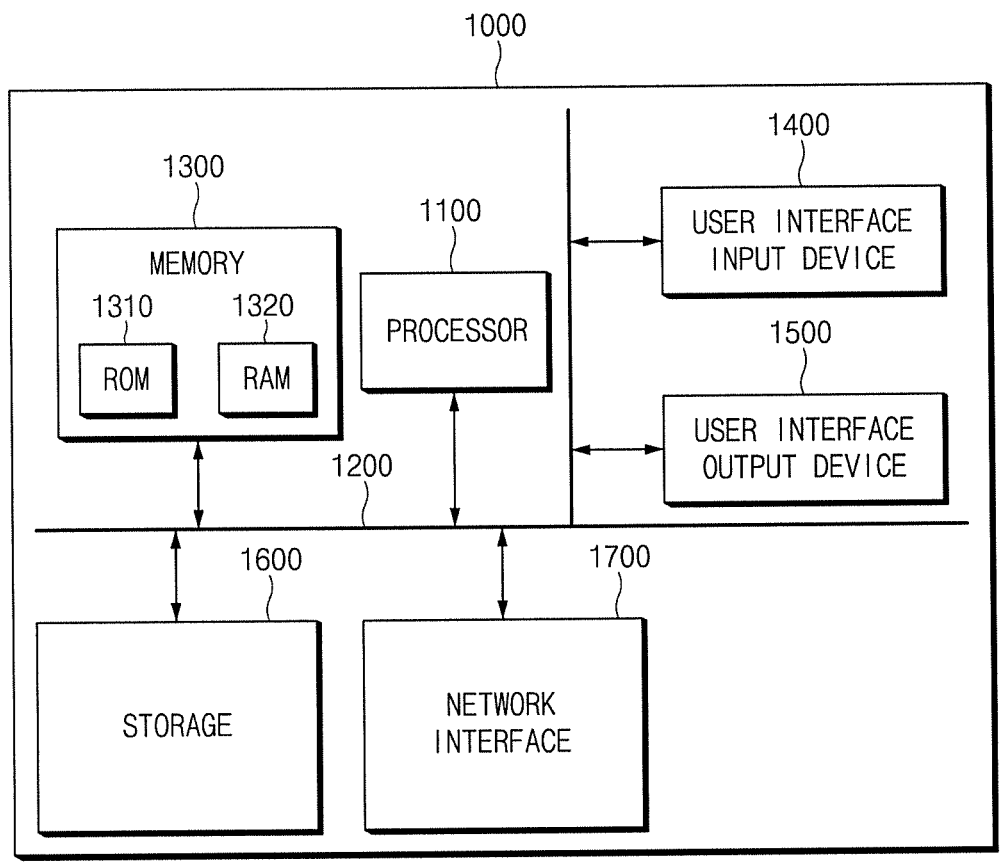
FIG. 10 illustrates a computing system according to an embodiment of the present disclosure.

FIG. 10 illustrates a computing system according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The present disclosure may perform parking control on the next parking space of an object (the parked vehicle) in a parking control mode, thereby enhancing the efficiency of parking control and a user's convenience.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling parking of a vehicle, comprising:
 a processor configured to determine whether to generate a virtual object, depending on a length of a parking space and a current location of the vehicle, determine a parking target space in the parking space based on the virtual object upon generating the virtual object, and generate a parking trajectory such that the vehicle is parked to the parking target space, to perform parking control based on the parking trajectory, when the parking space between a first object and a second object is scanned; and
 a storage for storing information generated by the processor,
 wherein the processor is further configured to:
 determine that the parking space includes a first parking space adjacent to the first object and a second parking space located between the first parking space and the second object, when a length of the parking space between the first object and the second object is greater than a predetermined reference value, and
 generate the virtual object in the second parking space and determine that the first parking space is the parking target space, when the current location of the vehicle is before the second object.

2. The apparatus of claim 1, wherein the processor is configured to:
 determine that an entire scanned parking space is the parking target space, when the length of the parking space between the first object and the second object is less than the predetermined reference value.

3. The apparatus of claim 1, wherein the processor is configured to:
 determine the parking target space in the parking space such that the vehicle is parked within a specific distance from an object with a least number of parking steps during the parking control at the current location of the vehicle, when the length of the parking space between the first object and the second object is greater than the predetermined reference value.

4. The apparatus of claim 1, wherein the processor is configured to:
 determine that the second parking space is the parking target space, when the current location of the vehicle is next to or after the second object.

5. The apparatus of claim 1, wherein the processor is configured to:
 determine a location of the virtual object depending on whether a curb or a wall is present and a slope direction of the first object.

6. The apparatus of claim 5, wherein the processor is configured to:
 when the curb or the wall is present,
 determine a location, which moves from the first object in a direction of the curb or the wall by an overall length or an overall width of the vehicle, to be an X-coordinate of the virtual object;
 determine a location, which moves from the curb in a direction perpendicular to the curb or the wall by the overall width or the overall length of the vehicle, to be a Y-coordinate of the virtual object; and
 determine an angle of the virtual object by using the direction of the curb or the wall.

7. The apparatus of claim 5, wherein the processor is configured to:
 when the curb or the wall is not present,
 extract a slope of the first object to determine a location, which moves in the slope direction of the first object at each corner point of the first object by an overall length or an overall width of the vehicle, to be an X-coordinate of the virtual object;
 determine a location identical to each corner point of the first object in the slope direction of the first object, to be a Y-coordinate of the virtual object; and
 determine an angle of the virtual object by using the slope of the first object.

8. The apparatus of claim 5, wherein the processor is configured to:
 when the curb or the wall is not present and it is impossible to extract a slope of the first object,
 determine a location, which moves in a space scan direction of the vehicle from each corner point of the first object by an overall length or an overall width of the vehicle, to be an X-coordinate of the virtual object;
 determine a location identical to each corner point of the first object in the space scan direction of the vehicle, to be a Y-coordinate of the virtual object; and determine an angle of the virtual object by using the space scan direction of the vehicle.

9. The apparatus of claim 1, wherein the processor is configured to:
 generate the parking trajectory based on the first object and the virtual object.

10. The apparatus of claim 1, wherein the processor is configured to:
 generate a plurality of parking trajectories by using at least one steering ratio of a vehicle, the current location of the vehicle, and the parking target space;
 extract trajectories, in each of which the first object and the second object do not collide with the vehicle, from among the plurality of parking trajectories; and
 select a trajectory with a shortest route among the extracted trajectories.

11. A vehicle system comprising:
 a sensor configured to scan an object and a parking space; and
 a vehicle parking controlling apparatus, wherein the vehicle parking controlling apparatus is configured to:
 when the parking space between a first object and a second object is scanned,
 determine whether to generate a virtual object, depending on a length of the parking space and a current location of a vehicle;
 determine a parking target space in the parking space based on the virtual object upon generating the virtual object; and
 generate a parking trajectory such that the vehicle is parked to the parking target space, to perform parking control based on the parking trajectory,
 wherein the vehicle parking controlling apparatus is further configured to:
 determine that the parking space includes a first parking space adjacent to the first object and a second parking space located between the first parking space and the second object, when a length of the parking space between the first object and the second object is greater than a predetermined reference value, and generate the virtual object in the second parking space and determine that the first parking space is the parking target space, when the current location of the vehicle is before the second object.

12. The vehicle system of claim 11, further comprising:
a display device configured to display the scanned object, the scanned parking space, and the parking trajectory.

13. A method of controlling parking of a vehicle, the method comprising:
determining whether to generate a virtual object, depending on a length of a parking space and a current location of the vehicle to generate the virtual object, when the parking space between a first object and a second object is scanned;
determining a parking target space in the parking space based on the virtual object;
generating a parking trajectory such that the vehicle is parked to the parking target space; and
performing parking control based on the parking trajectory,
wherein the determining of the parking target space includes:
determining that the parking space includes a first parking space adjacent to the first object and a second parking space located between the first parking space and the second object, when a length of the parking space between the first object and the second object is greater than a predetermined reference value;
generating the virtual object in the second parking space and determining that the first parking space is the parking target space, when the current location of the vehicle is located before the second object; and
determining that the second parking space is the parking target space, when the current location of the vehicle is located next to or after the second object.

14. The method of claim 13, wherein the determining of the parking target space includes:
determining that an entire scanned parking space is the parking target space, when the length of the parking space between the first object and the second object is less than the predetermined reference value.

15. The method of claim 13, wherein the determining of the parking target space includes:
determining the parking target space in the parking space such that the vehicle is parked within a specific distance from an object with a least number of parking steps during the parking control at the current location of the vehicle, when the length of the parking space between the first object and the second object is greater than the predetermined reference value.

16. The method of claim 13, wherein the generating of the virtual object includes:
determining a location of the virtual object depending on whether a curb or a wall is present and a slope direction of the first object.

17. The method of claim 16, wherein the generating of the parking trajectory includes:
generating the parking trajectory based on the first object and the virtual object; or
generating a plurality of parking trajectories by using at least one steering ratio of a vehicle, the current location of the vehicle, and the parking target space, extracting trajectories, in each of which the first object and the second object do not collide with the vehicle, from among the plurality of parking trajectories, and selecting a trajectory with the shortest route among the extracted trajectories.

* * * * *